US009927905B2

(12) United States Patent
Smith (10) Patent No.: US 9,927,905 B2
(45) Date of Patent: Mar. 27, 2018

(54) FORCE TOUCH BUTTON EMULATION (71) Applicant: Apple Inc., Cupertino, CA (US)

(72) Inventor: John Stephen Smith, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 14/830,279

(22) Filed: Aug. 19, 2015

(65) Prior Publication Data
US 2017/0052622 A1    Feb. 23, 2017

(51) Int. Cl.
G06F 3/041    (2006.01)
G06F 3/0488    (2013.01)

(52) U.S. Cl.
CPC .......... G06F 3/0416 (2013.01); G06F 3/0488 (2013.01); G06F 2203/04105 (2013.01)

(58) Field of Classification Search
None
See application file for complete search history.

(56) References Cited

U.S. PATENT DOCUMENTS

| | | | |
|---|---|---|---|
| 5,142,912 A | 9/1992 | Frische | |
| 5,345,807 A | 9/1994 | Butts et al. | |
| 5,905,430 A | 5/1999 | Yoshino | |
| 6,069,417 A | 5/2000 | Yuan | |
| 6,099,476 A | 8/2000 | Engel | |
| 6,130,517 A | 10/2000 | Yuan | |
| 6,788,050 B2 | 9/2004 | Gotkis | |
| 7,046,496 B2 | 5/2006 | Hsin | |
| 7,451,050 B2 * | 11/2008 | Hargreaves | G06F 3/0418 375/350 |
| 7,536,918 B2 | 5/2009 | Rankin et al. | |
| 7,543,501 B2 | 6/2009 | Cottles et al. | |
| 7,683,634 B2 | 3/2010 | Hoen | |
| 7,688,308 B2 | 3/2010 | Inokuchi | |
| 7,825,903 B2 | 11/2010 | Anastas et al. | |

(Continued)

FOREIGN PATENT DOCUMENTS

CN    102236463    0/2011
CN    1496549    5/2004
(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — Antonio Xavier
(74) *Attorney, Agent, or Firm* — Brownstein Hyatt Farber Schreck, LLP (57) ABSTRACT

Disclosed herein is an electronic device having a force sensing device. The force sensing device receives a continuous force input which is translated into a discrete event. In order to more accurately determine when the discrete event is to occur, the electronic device includes a two low-pass filters that concurrently receive a force signal from the force sensing device. The first low-pass filter has a first bandwidth and the second low-pass filter has a second bandwidth that is greater than the first bandwidth. The two low-pass filters filter the force signal to provide a user interface with a precise feel for slower more deliberate input while also providing fast response times for stronger, shorter input.

20 Claims, 5 Drawing Sheets

(56) References Cited

U.S. PATENT DOCUMENTS

| | | | |
|---|---|---|---|
| 8,290,602 B2 | 10/2012 | Begey et al. | |
| 8,436,809 B2 | 5/2013 | Sohn et al. | |
| 8,547,118 B1* | 10/2013 | Vojjala | G06F 3/0416 |
| | | | 324/667 |
| 8,547,350 B2 | 10/2013 | Anglin et al. | |
| 8,599,165 B2 | 12/2013 | Westhues et al. | |
| 8,622,923 B2 | 1/2014 | Pons et al. | |
| 8,760,248 B2 | 6/2014 | Marie | |
| 8,976,137 B2 | 3/2015 | Goo et al. | |
| 8,982,310 B2 | 3/2015 | Roudbari et al. | |
| 9,052,250 B1 | 6/2015 | Parker et al. | |
| 9,104,267 B2* | 8/2015 | Choi | G06F 3/044 |
| 9,373,993 B2 | 6/2016 | Irwin | |
| 9,389,686 B2 | 7/2016 | Zoller et al. | |
| 2004/0056845 A1* | 3/2004 | Harkcom | G06F 3/044 |
| | | | 345/173 |
| 2004/0100007 A1 | 5/2004 | Engwall et al. | |
| 2004/0105040 A1* | 6/2004 | Oh | G02F 1/13338 |
| | | | 349/12 |
| 2007/0233407 A2* | 10/2007 | Cech | B60R 21/0136 |
| | | | 702/65 |
| 2007/0268246 A1* | 11/2007 | Hyatt | G06F 1/1626 |
| | | | 345/156 |
| 2008/0011091 A1 | 1/2008 | Weldon | |
| 2008/0111714 A1* | 5/2008 | Kremin | G06F 3/044 |
| | | | 341/33 |
| 2008/0158153 A1* | 7/2008 | Sohn | A63F 13/04 |
| | | | 345/157 |
| 2008/0289887 A1* | 11/2008 | Flint | G06F 3/0414 |
| | | | 178/18.03 |
| 2009/0028321 A1* | 1/2009 | Cheng | H04B 3/234 |
| | | | 379/406.08 |
| 2010/0005851 A1 | 1/2010 | Cottles et al. | |
| 2010/0123686 A1* | 5/2010 | Klinghult | G06F 3/0412 |
| | | | 345/178 |
| 2010/0309146 A1 | 12/2010 | Lee et al. | |
| 2011/0227872 A1 | 9/2011 | Huska et al. | |
| 2012/0038577 A1 | 2/2012 | Brown et al. | |
| 2012/0319827 A1 | 12/2012 | Pance et al. | |
| 2013/0127756 A1 | 5/2013 | Wang et al. | |
| 2013/0321338 A1* | 12/2013 | Murphy | G06F 1/3215 |
| | | | 345/174 |
| 2014/0043177 A1* | 2/2014 | Pagnanelli | H03M 3/30 |
| | | | 341/143 |
| 2014/0092064 A1* | 4/2014 | Bernstein | G06F 3/016 |
| | | | 345/174 |
| 2014/0104225 A1* | 4/2014 | Davidson | G06F 3/044 |
| | | | 345/174 |
| 2014/0142395 A1* | 5/2014 | Sattler | A61B 5/7203 |
| | | | 600/300 |
| 2014/0160063 A1* | 6/2014 | Yairi | G06F 3/044 |
| | | | 345/174 |
| 2014/0176485 A1 | 6/2014 | Holmberg et al. | |
| 2014/0266843 A1* | 9/2014 | Pagnanelli | H03M 3/468 |
| | | | 341/155 |
| 2014/0298884 A1 | 10/2014 | Mindlin et al. | |
| 2015/0002442 A1* | 1/2015 | Woolley | G06F 3/0416 |
| | | | 345/174 |
| 2015/0042610 A1* | 2/2015 | Takano | G06F 3/044 |
| | | | 345/174 |
| 2015/0103961 A1* | 4/2015 | Malipatil | H04L 7/0016 |
| | | | 375/355 |
| 2015/0160783 A1 | 6/2015 | Kaneko et al. | |
| 2015/0179122 A1* | 6/2015 | Brown | G06F 3/0416 |
| | | | 345/174 |
| 2015/0371608 A1* | 12/2015 | Yamaguchi | G06F 3/044 |
| | | | 345/174 |
| 2016/0179200 A1 | 6/2016 | Billington et al. | |
| 2016/0179243 A1* | 6/2016 | Schwartz | G06F 3/044 |
| | | | 345/174 |
| 2016/0216833 A1 | 7/2016 | Butler et al. | |
| 2016/0259411 A1 | 9/2016 | Yoneoka et al. | |
| 2016/0259465 A1 | 9/2016 | Agarwal et al. | |
| 2017/0017346 A1 | 1/2017 | Gowreesunker et al. | |
| 2017/0351368 A1 | 12/2017 | Agarwal et al. | |

FOREIGN PATENT DOCUMENTS

| | | |
|---|---|---|
| CN | 102713805 | 10/2012 |
| CN | 103097990 | 5/2013 |
| EP | 0178590 | 8/1986 |
| EP | 1455264 | 8/2004 |
| WO | WO 10/055195 | 5/2010 |
| WO | WO 13/170099 | 11/2013 |
| WO | WO 13/188307 | 12/2013 |
| WO | WO 14/101943 | 7/2014 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touch-screens-354860, Mar. 7, 2014, 1 page.

* cited by examiner

FORCE TOUCH BUTTON EMULATION

FIELD

The described embodiments relate generally to translating continuous force input received by an electronic device into one or more discrete events. More specifically, the described embodiments are directed to filtering a force signal that is output from a force sensing device using multiple low-pass filters. Each low-pass filter has different bandwidths and latencies. Thus, the electronic device can more quickly and easily discern between force input that is slow, deliberate and precise versus force input that is quick, strong and may require a faster response time.

BACKGROUND

Many electronic and input devices include a touch-sensitive surface for receiving user input. Devices such as smart telephones, tablet computing devices, laptop computers, track pads, wearable communication and health devices, navigation devices, and kiosks can include a touch-sensitive surface. The touch-sensitive surface may detect and relay the location of one or more user touches, which may be interpreted by the electronic device as a command or a gesture.

In some electronic devices, a force sensor may also be used to detect and measure the force of a touch that is applied to a surface. In some cases, a force sensor and touch sensor may provide an enhanced user input for controlling an application or function of the electronic device as compared to using a touch sensor alone.

However, one challenge with incorporating a force sensing device into an electronic device is determining and compensating for the amount of noise that may be present in the electronic device and while still providing adequate response times for each type of input. For example, the display of the electronic device or other components in the electronic device can introduce noise into the force signals produced by the force sensing device. The noise can cause errors in the force measurements which may affect both the input that is detected by the force sensing device and the output that is provided in response to the received force input. However, removal or otherwise minimizing the amount of noise present in the system may cause an undesired amount of latency in response time of the electronic device.

SUMMARY

Disclosed is a method for determining a type of input received on a surface of an electronic device. According to this method, a continuous force signal is received from a force sensing device. The force signal is subsequently provided to a first low-pass filter having a first bandwidth and concurrently provided to a second low-pass filter having a second bandwidth that is greater than the first bandwidth. A determination is made within a first time period whether the force signal exceeds a first threshold associated with the first low-pass filter. Likewise, a determination is also made within a second time period whether the force signal exceeds a second threshold associated with the second low-pass filter. The second time period is shorter than the first time period and the second threshold is higher than the first threshold in order to quickly distinguish between slow, deliberate user input from short, hard and/or user input with a greater amount of force.

An electronic device having a force sensing device, two or more low-pass filters, a processing unit and a memory is also disclosed. The first low-pass filter filters a first amount of noise due to its bandwidth and the second low-pass filter filters a second amount of noise due to its bandwidth which is greater than the bandwidth of the first low-pass filter. The second amount of noise is less than the first amount of noise. The force sensing device samples the continuous force signal and provides the samples of the continuous force signal to the first low-pass filter and the second low-pass filter. The first low-pass filter provides an output of the force signal at a first output rate while the second low-pass filter provides an output of the force signal at a second output rate that is higher than the first output rate. Using the output from the first low-pass filter and the second low-pass filter, a determination is made as to whether the continuous force signal is associated with a discrete event. More specifically, a discrete event is triggered when the output from first low-pass filter exceeds a first threshold or when the output from the second low-pass filter exceeds a second, higher, threshold.

Also disclosed is a method for translating a continuous force signal into a discrete event. According to this method, a force signal is received from a force sensing device. The force signal is then concurrently provided to a first low-pass filter and a second low-pass filter. The output from the first low-pass filter is sampled at a first rate while the output from the second low-pass filter is sampled at a second rate. When output from the first low-pass filter exceeds a first threshold, a command associated with the output from the first low-pass filter is issued. Likewise, when the output from the second low-pass filter exceeds a second threshold that is greater than the first threshold, a command associated with the output from the second low-pass filter is issued.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure is directed to an electronic device having a force sensing device that determines an amount of force provided on an input surface of the electronic device. As force input is received on the surface of the electronic device, the force sensing device detects the amount of force and concurrently provides a force signal representative of the amount of force to a first low-pass filter and a second low-pass filter.

The low-pass filters are used to attenuate high frequencies over the cutoff frequency while allowing fast response times to high amplitude force inputs. For example, using the output from the two filters, the electronic device may be able to distinguish user inputs as early as possible while rejecting noise that may be present in a force signal provided by the force sensing device. More specifically, the two low-pass filters have different bandwidths that concurrently filter the force signal. One of the low-pass filters has a smaller bandwidth and filters more samples over a given time period while the second low-pass filter has a larger bandwidth and filters fewer samples of the given time period. Both filters work in conjunction in order to reduce the likelihood that noise, vibrations or other interferences cause a discrete event, such as a button press event or a button release event, to be triggered inadvertently.

As will be explained below, the force sensing device detects an amount of continuous force that is applied or otherwise provided to an input surface of the electronic device. This continuous force may then be translated into a discrete event, series of discrete events, or digital outputs. Non-limiting examples of discrete events include input that may be equivalent to a mouse click, a button press, a drag and drop operation, a double click and the like. Accordingly, the input surface of the electronic device, such as, for example, a cover glass of a display stack of the electronic device, may be used as an input mechanism instead of a button, a mouse or other such mechanical input device. Further, it should be appreciated that embodiments described herein may produce multiple discrete outputs corresponding to multiple amounts or levels of force provided to the input surface. For example, a first amount of force may correspond to a first input and a second amount of force may correspond to a second input. The first and second inputs may be two variants of a single type of input (for example, a first and second type of selection) or may be different types of input (for example, a selection input and an input corresponding to moving or dragging an object, inputting a command and then confirming the command, changing a speed at which an operation occurs, and so forth). Thus, the force sensing device may detect a variety of different forces that may be used for a number of different types of input; such inputs may dynamically vary as well. Further, the detected force may be used to trigger corresponding outputs, which again may vary with the force sensed.

However, noise that is present in the force signal or the electronic device itself may affect the accuracy of the force sensing device and/or the force signal. For example, if the continuous force that is received is equivalent to a button press and release, the amount of force that is received must pass a first threshold amount of force in order to qualify as a button press event and must also pass a second threshold amount of force (typically an amount of force that is less than the first threshold amount of force) to qualify as a button release event. Any noise that is present in the force signal or the electronic device may cause the force sensing device to falsely recognize a button press event and/or a button release event when one is not intended by the user.

Accordingly the first low-pass filter with the smaller bandwidth may be used to reduce the amount of noise present in the signal to provide a precise, but relatively slower (when compared to the second low-pass filter), input recognition. The second low-pass filter may have has a greater bandwidth and, as a result, attenuates fewer signals. As such, when the amount of force provided on the input surface is clearly distinguishable from the noise that may be present in the system (e.g., the amplitude of the force signal clearly exceeds a force threshold), the second low-pass filter provides a signal indicative of the received response. Accordingly, the second low-pass filter may provide a faster response time when compared to the response time of the first low-pass filter.

Figure 1:
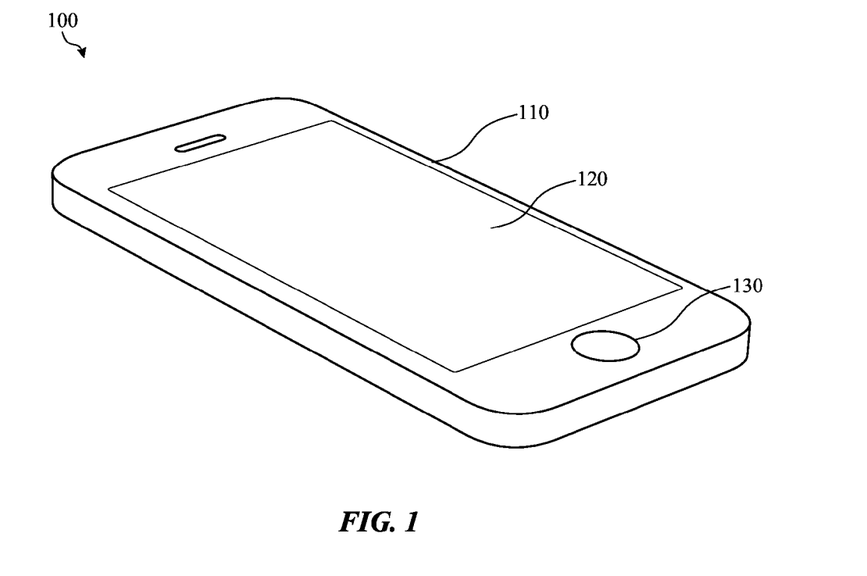
FIG. 1 shows an example electronic device that may use or incorporate a force sensing device according to one or more embodiments of the present disclosure.

FIG. 1 shows an example electronic device 100 that may include or incorporate a force sensing device according to one or more embodiments of the present disclosure. The electronic device 100 may be a mobile telephone although other electronic devices are contemplated. For example, the electronic device 100 may be a tablet computer, a laptop computer, a wearable electronic device, a digital media player, a display input device, a remote control device or any such electronic device that may use force sensing device to detect received input.

The electronic device 100 includes an enclosure 110 surrounding a display 120 and one or more input/output devices (shown as a button 130). The enclosure 110 can form an outer surface or partial outer surface for the internal components of the electronic device 100. The enclosure 110 may be a housing formed of one or more components that are operably connected together. For example, the enclosure 110 may include a front piece and a back piece. Alternatively, the enclosure 110 may be formed as a single piece that is operably connected to the display 120.

The button 130 may be implemented as any type of mechanical input device. The button 130 can also be a soft button (e.g., a button or input device that does not physically move but still accepts inputs). Although a button 130 is specifically shown, various input and output devices may be used. Further, the button 130 can be integrated as part of a cover glass of the electronic device 100. Although not shown in FIG. 1, the electronic device 100 can include a microphone, a speaker, a trackpad, a camera, and one or more ports such as a network communication port and/or a power cord port and so on.

The display 120 can be implemented as any suitable display including, but not limited to, a multi-touch sensing touchscreen device that uses liquid crystal display (LCD) technology, light emitting diode (LED) technology, organic light-emitting display (OLED) technology, or organic electro luminescence (OEL) technology.

The display 120 may be used in a variety of ways. For example, the display 120 may be used to output information and may also be used as part of a touch sensing function and a force sensing function. In other words, a user can interact with an image displayed on the display 120 with one or more touches, an applied force, or both touch and force.

The touch sensing and force sensing functions can each use or share some or all of the display area. For example, a user can interact with a displayed image by touching and/or by applying a force at various locations on the display 120. In another embodiment, the touch sensing function can use the entire area of the display 120 while the force sensing function involves only a portion of the display 120. Thus, each function can use some or all of the display 120 when in operation.

The force sensing function may be provided by a force sensing device that is integrated with or otherwise associated with the display 120 or other component of the electronic device 100. Likewise, the touch sensing function may be provided by a touch sensing device that is integrated with or otherwise associated with the display 120. The touch sensing device and the force sensing device can employ any suitable sensing technology. For example, each of the touch sensing device and the force sensing device can use capacitive sensing technology, resistive sensing technology, piezoelectric or piezoresistive sensing technology, magnetic technology, optical technology, inductive technology, ultrasonic sensing technology and so on.

In some embodiments, the force sensing device is a strain sensor that detects a force that is applied to the electronic device 100 or to a component of the electronic device 100 such as the display 120, the button 130 or other mechanical input device. For example and as briefly described above, the force sensing device may be included or otherwise associated with an input button and/or an input region or surface of the electronic device 100. In a more specific example, the strain sensor may be implemented as a force sensitive film that produces a signal or a change in a signal in response to strain. The signal is used to determine or estimate an amount of force applied to an input region. The force sensitive film may be formed with a piezoresistive material.

The touch sensing device may be implemented as a capacitive touch sensing device that determines a location of one or more touches applied to an input region through capacitance changes in one or more capacitive sensing elements. Other embodiments can use a different type of a force sensing device and/or touch sensing device, including, but not limited to, resistive, ultrasonic, thermal, capacitive, or piezoelectric devices.

Using the various touch sensing and force sensing devices described above, a received force, such as, for example, a continuous force input, can be translated into a discrete event. For example, as force input is received, the amount of force over a given time period is monitored. Once the force input reaches a first threshold (e.g., 200 grams of force), a "button press" event is detected. When the force input reaches a second threshold that is typically less than the first threshold (e.g., 150 grams of force), a "button release" event is detected. The difference in the force thresholds is typically referred to as hysteresis. That is, the force threshold has a first value in a first direction and has a second value when transitioning to a different direction.

However, if noise is present in the electronic device 100, the accuracy of the button press event and/or button release event may be compromised. For example, if the amount of force received and/or detected by the force sensing device is approximately 120 grams of force (e.g., a user is intentionally not providing enough force to trigger a button press event), any noise that is present in the electronic device 100 may cause the force sensing device to erroneously determine that 150 grams of force or more has been provided. This causes the force sensing device to trigger a false button press event. Likewise, if a user has exerted over 150 grams of force to trigger a button press event, any noise that is present in the electronic device 100 may cause the force sensing device to erroneously determine that the received amount of force has passed below the second threshold thereby prematurely signaling a button release event. In yet another example, the amount of noise present in the electronic device 100 may cause the force sensing device to erroneously determine that an applied amount of force does not exceed the first force threshold or does not pass below the second force threshold. As such, the button press event or the button release event may be detected too late.

Although specific ranges and thresholds are given, the force sensing device described herein may sense continuous force input over a variety of ranges and across a range of sensor sensitivity. For example, the force sensing device can detect continuous ranges of force from zero to the first threshold, the second threshold and beyond. Likewise, the force sensing device can detect continuous ranges of force from the first threshold, the second threshold down to zero. For example, once the first threshold and/or the second threshold have been crossed, the force sensing device can still detect an increase (or decrease) in the amount of force that is received and/or applied to the input surface of the electronic device.

In one implementation, the electronic device 100 includes two (or optionally more) low-pass filters. The low-pass filters are used to attenuate high frequency components or otherwise remove or reduce noise that may be present in a force signal that is provided by the force sensing device. For example, noise or other signals above a certain frequency may be attenuated by each low-pass filter. More specifically, each low-pass filter has a particular bandwidth that filters the force signal.

The first low-pass filter (or "slow" low-pass filter) has a first bandwidth while a second low-pass filter (or "fast" low-pass filter) has a second bandwidth that is greater than the first bandwidth. In addition, the first low-pass filter samples the force signal at a first sample rate while the second low-pass filter samples the force signal at a second rate that is faster than the first sample rate.

Because the second low-pass filter passes more high frequency components and samples the force signal at a higher rate than the first low-pass filter, output from the second low-pass filter may quickly identify drastic changes in the force signal (e.g., an increase in the received force signal) than the output from the first low-pass filter. Thus, the first low-pass filter may be used to detect deliberate and precise input while the second low-pass filter may be used to detect quick, hard and/or fast input.

In addition, each low-pass filter has respective high and low force thresholds that correspond to button press events and button release events. For example, the first low-pass filter (or slow low-pass filter) has a high force threshold (referred to herein as $T_{HS}$) and a low force threshold (referred to herein as $T_{LS}$). Likewise, the second low-pass filter (or fast low-pass filter) has a high force threshold (referred to herein as $T_{HF}$) and a low force threshold (referred to herein as $T_{LF}$). The high force threshold for the second low-pass filter is higher than the high force threshold for the first low-pass filter. The low force threshold for the second low-pass filter is lower than the low force threshold for the first low-pass filter. Put another way, the thresholds for each low-pass filter are configured such that $T_{LF} < T_{LS} < T_{HS} < T_{HF}$.

When force input is detected by the force sensing device, a force signal that is indicative of the received force input is concurrently provided to each low-pass filter. Once the force input signal has been filtered for noise or other high frequency components, and if $T_{HS}$ has been exceeded, a button press event for a first type of input is detected. If a button press event has been detected and the output from the first low-pass filter is below $T_{LS}$ and the detected amount of force is between $T_{HF}$ and $T_{HS}$, a button release event is triggered.

Likewise, if the state of the button is in a button release state, and the output from the second filter is higher than $T_{HF}$, a button press event is triggered for a second type of input is detected. If the state of the button is in a pressed state and the output from the second filter falls below the $T_{LF}$, the state of the button changes from the button pressed state to a button released state.

Using this mechanism, an electronic device may have an input mechanism or button with a precise feel for slower, more deliberate input while having a quick response for more aggressive types of input.

Figure 2:
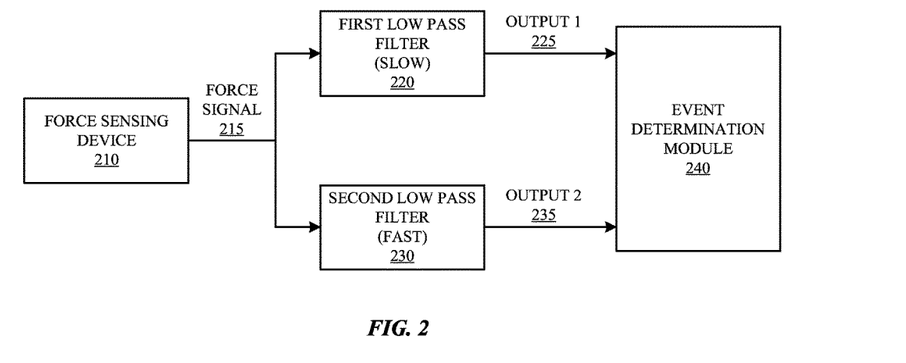
FIG. 2 illustrates example components of an electronic device that may be used to distinguish different types of force input according to one or more embodiments of the present disclosure.

FIG. 2 illustrates example components of an electronic device that may be used to distinguish different types of force input according to one or more embodiments of the present disclosure. More specifically, the components shown in FIG. 2 may be incorporated in the electronic device 100 shown and described above with respect to FIG. 1.

For example, the electronic device may include a force sensing device 210 that detects an amount of force provided on an input surface of the electronic device. The force sensing device 210 may use capacitive sensing technology, resistive sensing technology, piezoelectric or piezoresistive sensing technology, magnetic technology, optical technology, inductive technology, ultrasonic sensing technology, acoustic waves and the like. The force sensing device may be incorporated into an electronic device, and may be located within a housing, beneath a cover, or otherwise shielded from an environment by a structure of the electronic device in certain embodiments, although this is not necessary.

As one example, a capacitive force sensor may be formed from two or more capacitive electrodes or other elements (or two or more arrays of electrodes or other elements). An exerted force may cause the electrodes to move closer to one another, thereby changing the capacitance between the two electrodes. This change in capacitance may be detected, a signal outputted, and the change in capacitance (or current capacitance) equated to the input force and used as a system input. In other embodiments, a single capacitive element (or array of single capacitive elements) may detect a change in capacitance with an object exerting the force, with similar results.

In some embodiments, the force sensing device 210 may sample the received force input at a particular rate. These samples may be averaged over a given time period and reported to the operating system of the electronic device. In some implementations, the operating system receives the averaged samples every sixteenth of a second although other report rates may be used.

From this information, the operating system may determine what, if any, actions need to be performed in response to the received force. For example, if the received averaged samples exceed a particular force threshold, a discrete event, such as, for example, a button press event, is registered. Likewise, when the averaged samples fall below a particular force threshold, a second discrete event, such as, for example, a button release event, is triggered. As yet another example, a continuum of inputs may be provided instead of a single, toggle-type (e.g., present or not) input. For example, variances in a detected force may be used to change: a speed at which an operation occurs; an acceleration of a cursor, scroll bar, document scrolling, and the like; a selected or outputted color, sound, or the like; and so on.

However, in order to speed up recognition of discrete events such as, for example a button press and a button release, as well as increase confidence that a discrete event has occurred, the force signal 215 is concurrently provided to a first low-pass filter 220 and a second low-pass filter 230. As will be explained in greater detail below, the first low-pass filter 220 (or slow low-pass filter) averages the most recent N number of samples to provide an output (e.g., output 1 225) to an event determination module 240. Likewise, the second low-pass filter 230 averages the most recent M number of samples to provide an output (e.g., output 2 235) to the event determination module 240.

More specifically, the force sensing device 210 may sample received force input at a rate 12,000 samples per second to generate a force signal 215. The force signal 215 is then concurrently provided to the first low-pass filter 220 and the second low-pass filter 230. The first low-pass filter 220 averages the last N number of samples received and generates output 1 225 at a first output rate.

In some implementations, the first low-pass filter 220 averages the last 200 samples with an output rate of 120 samples per second. Likewise, the second low-pass filter 230 averages the last M number of samples received and generates output 2 235 at a second output rate. In some implementations, the second low-pass filter 230 averages the last 100 samples with an output rate of 600 samples per second. Although specific sample sizes and output rates have been discussed, other sample sizes and output rates may be used.

When each low-pass filter has generated their respective outputs, the outputs 225, 235 are provided to an event determination module 240. The event determination module 240 determines when the continuous force input that was initially received or otherwise detected by the force sensing device 210 qualifies or triggers a discrete event. A discrete event, such as a button press, is triggered when a received amount of force crosses a force threshold. That is, when the received amount of force crosses a first force threshold, a button press event is detected. Likewise, when the received amount of force falls below a second threshold (typically less than the first threshold) a button release event is triggered.

As discussed above, the first low-pass filter 220 is associated with a first force threshold $T_{HS}$ and a second force threshold $T_{LS}$. In some embodiments, the second force threshold $T_{LS}$ is lower than the first force threshold $T_{HS}$. In a non-limiting example, the first force threshold $T_{HS}$ may be approximately 125 grams of force and the second force threshold $T_{LS}$ may be approximately 75 grams of force although other thresholds may be used.

The second low-pass filter 230 is also associated with a first force threshold $T_{HF}$ and a second force threshold $T_{LF}$. In some embodiments, the second force threshold $T_{LF}$ is lower than the first force threshold $T_{HF}$. In a non-limiting example, the first force threshold $T_{HF}$ may be approximately 200 grams of force and the second force threshold $T_{LF}$ may be approximately 50 grams of force although other thresholds may be used.

When the first low-pass filter 220 provides output 1 225 to the event determination module 240, the event determination module 240 compares output 1 225 against the first force threshold $T_{HS}$ and the second force threshold $T_{LS}$ to determine if a discrete event has occurred. Likewise, when the second low-pass filter 230 provides output 2 235 to the event determination module 240, the event determination module 240 compares the output 2 235 to the first force threshold $T_{HF}$ and the second force threshold $T_{LF}$ to determine whether a discrete event has occurred.

In one non-limiting example, if a button press event has not been triggered and the event determination module determines that output 1 225 of the first low-pass filter 220 exceeds the first threshold $T_{HS}$, a button press event is triggered. In some embodiments, the event determination module 240 generates and/or issues an interrupt signal to the operating system of the electronic device indicating that a button press event has been detected.

The event determination module 240 continues to monitor the output 1 225 from the first low-pass filter 220 to determine when the output 1 225 falls below the second force threshold $T_{LS}$. Once the output 1 225 from the first low-pass filter falls below the second force threshold $T_{LS}$, a button release event is triggered. The event determination module 240 then generates and/or issues an interrupt signal to the operating system of the electronic device indicating that a button release event has been detected.

Likewise, if a button press event has not been triggered and the event determination module determines that output 2 235 of the second low-pass filter 230 exceeds the first threshold $T_{HF}$, a button press event is triggered. In some embodiments, the event determination module 240 generates and/or issues an interrupt signal to the operating system of the electronic device indicating that a button press event has been detected.

The event determination module 240 continues to monitor the output 2 235 from the second low-pass filter 230 to determine when the output 2 235 falls below the second force threshold $T_{LF}$. Once the output 2 235 from the second low-pass filter falls below the second force threshold $T_{LF}$, a button release event is triggered. The event determination module then generates and/or issues an interrupt signal to the operating system of the electronic device indicating that a button release event has been detected.

In some embodiments the hardware or firmware of the electronic device issues or generates the interrupt signal described above. In addition, the operating system may poll the event determination module 240 at various time periods to determine when the various force thresholds occur. However, because interrupts are generated by the hardware or firmware and then transmitted to the operating system, the operating system of the electronic device may more quickly recognize discrete events soon after they occur and does not need to wait for the polling data. As such, discrete events may be more quickly realized and acted upon.

Although the event determination module 240 generates button press events and button release events based on the output 1 225 and the output 2 235, the outputs may be combined in order to determine discrete events. For example, if either a button release event has been detected within a given time period (e.g., within the last 60$^{th}$ of a second or other such interval) and the output 1 225 exceeds the first threshold $T_{HS}$, a button press event is triggered. Likewise, if a button press event has been detected (even if the button press event was detected by output 2 235 crossing the first force threshold $T_{HF}$) and the output 1 225 falls below the second threshold $T_{LS}$, a button release event is detected. Accordingly, an interrupt is generated by the event determination module 240 and provided to the operating system.

Although interrupts are mentioned, the event determination module 240 may also report output 1 225 and output 2 235 to the operating system at regular intervals regardless of, or in addition to, when the interrupt signals are generated and/or issued. In some embodiments, the regular interval is approximately 120 samples per second.

As discussed above, the operation system may poll the event determination module 240 every sixteenth of a second. However, the polling frequency may be dynamically updated based on one or more operating factors or conditions of the electronic device. For example, the polling frequency may be updated based on one or more applications that are executing on the electronic device. The polling frequency may also be updated based on one or more detected noise conditions of the electronic device.

Figure 3:
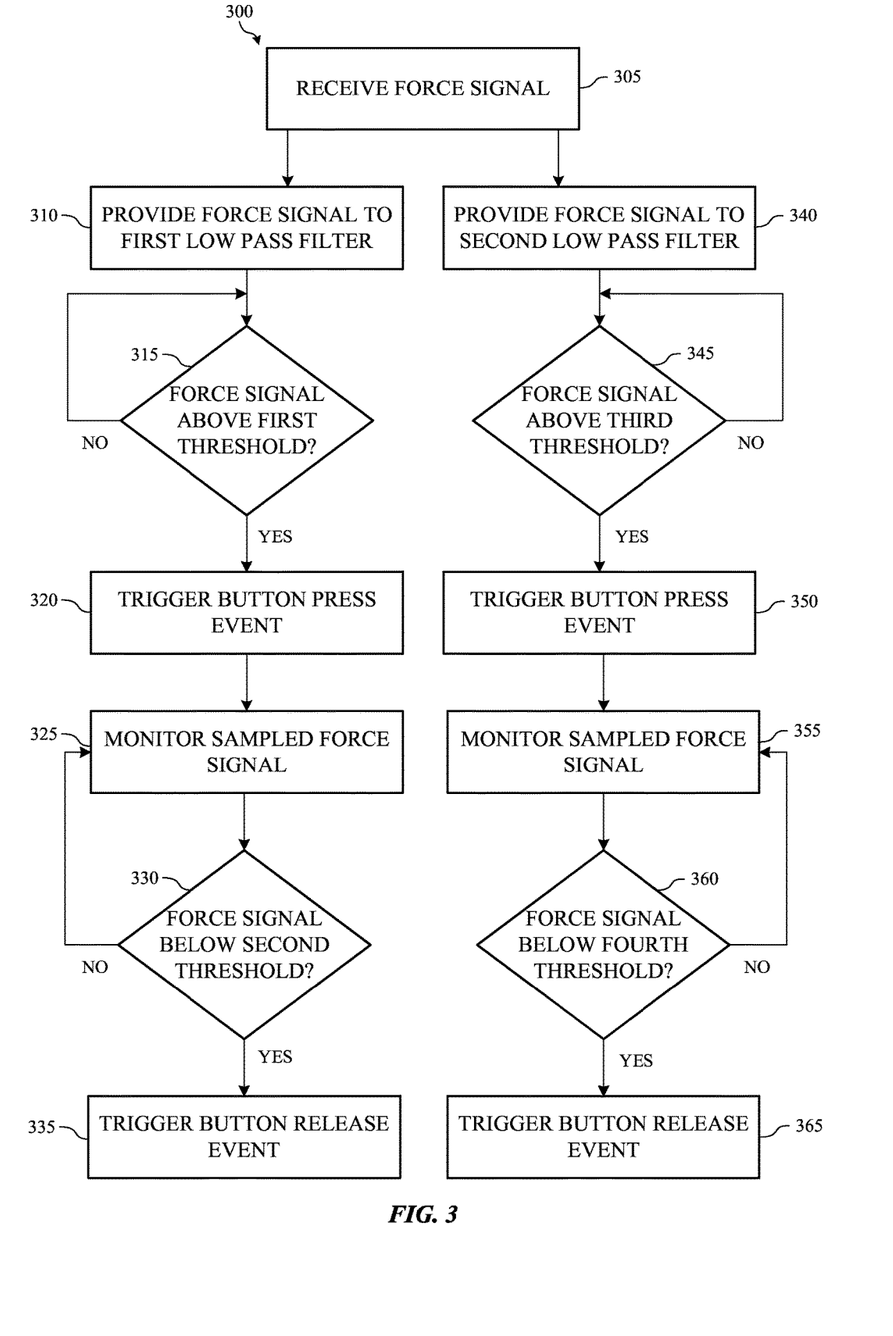
FIG. 3 illustrates a method for translating continuous force input into discrete events according to one or more embodiments of the present disclosure.

FIG. 3 illustrates a method 300 for translating continuous force input into discrete events according to one or more embodiments of the present disclosure. Method 300 may be used with the electronic device 100 shown and described above with respect to FIG. 1. Likewise, the method 300 may be executed by one or more components shown and described with respect to FIG. 2.

Method 300 begins at operation 305 when a force signal is received. The force signal is associated with a received force input on an input surface of an electronic device. More specifically, a force sensing device determines the amount of force that is provided to the input surface of the electronic device. The force sensing device may sample the received force input at a given rate. In some implementations and as discussed above, the force sensing device may sample the force input at a rate of 12,000 samples per second.

Once the force signal is received, the force signal is concurrently provided to a first low-pass filter 310 and a second low-pass filter 340. Although the operations of the method 300 may occur concurrently, the following operations are explained separately for clarity. That is, the operations of the first low-pass filter will be explained followed by an explanation of the operations associated with the second low-pass filter.

The first low-pass filter receives the force signal and determines a moving average of the last N samples that are received. As discussed above, the first low-pass filter may have a bandwidth that rejects or otherwise minimizes high frequency signals or noise. Thus, the first low-pass filter may be used to determine a first type of input (e.g., slow, deliberate force input). In some embodiments, the number of samples is 200 although other sample sizes are contemplated. The first low-pass filter outputs the average at determined output rate. In some embodiments, the output rate is approximately 120 samples per second.

Once the output is generated, flow proceeds to operation 315 and a determination is made as to whether the sampled force signal exceeds a first force threshold. The first force threshold may be equivalent to the first force threshold $T_{HS}$ described above. As also discussed, the first force threshold may be approximately 125 grams of force although other thresholds may be used. If the sampled force signal does not exceed the first force threshold, operation 315 repeats. That is, the output from the first low-pass filter is continuously monitored and averaged until the sampled force signal exceeds the first force threshold.

When the sampled force signal exceeds the first force threshold, flow proceeds to operation 320 and a button press event is triggered. In some embodiments, an event detection module or the hardware or firmware of the electronic device may issue an interrupt to the operating system to indicate that a button press event has occurred.

Flow then proceeds to operation 325 and the sampled force signal is continuously monitored and averaged to determine whether the sampled force input signal falls below a second force threshold. The second force threshold may be equivalent to the second force threshold $T_{LS}$ described above. As described above, the second force threshold may be approximately 75 grams of force. Once it is determine that the sampled force signal falls below the second force threshold, flow proceeds to operation 335 and a button release event is triggered. Like the button press event, the button release event may be an interrupt that is generated by the firmware or hardware of the electronic device.

As described above, the force signal is also provided 340 to the second low-pass filter. The second low-pass filter receives the sampled force signal and takes a moving average of the last M samples that are received. The second low-pass filter may have a larger bandwidth than that of the first low-pass filter. Accordingly, the second low-pass filter may be used to determine a second type of input (e.g., fast and high amplitude force inputs). In some embodiments, the number of samples is 100 although other sample sizes are contemplated. The second low-pass filter outputs the average at determined output rate. In some embodiments, the output rate is approximately 600 samples per second.

Because the second low-pass filter averages fewer samples at a higher sample rate, the latency of the second low-pass filter is less than the latency of the first low-pass filter. Although the second low pass filter may be faster than the first low pass filter, the first low pass filter is able to filter more noise than the second low pass filter. Thus, each low pass filter is suited to determining a particular type of input.

Once the output is generated, flow proceeds to operation 345 and a determination is made as to whether the sampled force signal exceeds a third force threshold. The third force threshold may be equivalent to the first force threshold $T_{HF}$ described above. The third force threshold may be approximately 200 grams of force although other thresholds may be used. If the sampled force signal does not exceed the first force threshold, operation 345 repeats. That is, the output from the second low-pass filter is continuously monitored until the sampled force signal exceeds the third force threshold.

When the sampled force signal exceeds the third force threshold, flow proceeds to operation 350 and a button press event is triggered. In some embodiments, an event detection module, the hardware or the firmware of the electronic device may issue an interrupt to the operating system to indicate that a button press event has occurred.

Flow then proceeds to operation 355 and the sampled force signal is continuously monitored to determine whether the sampled force input signal falls below a fourth force threshold. The fourth force threshold may be equivalent to the second force threshold $T_{LF}$ described above. Once it is determine that the sampled force signal falls below the second force threshold, flow proceeds to operation 365 and a button release event is triggered. Like the button press event, the button release event may be an interrupt that is generated as previously described.

Figure 4:
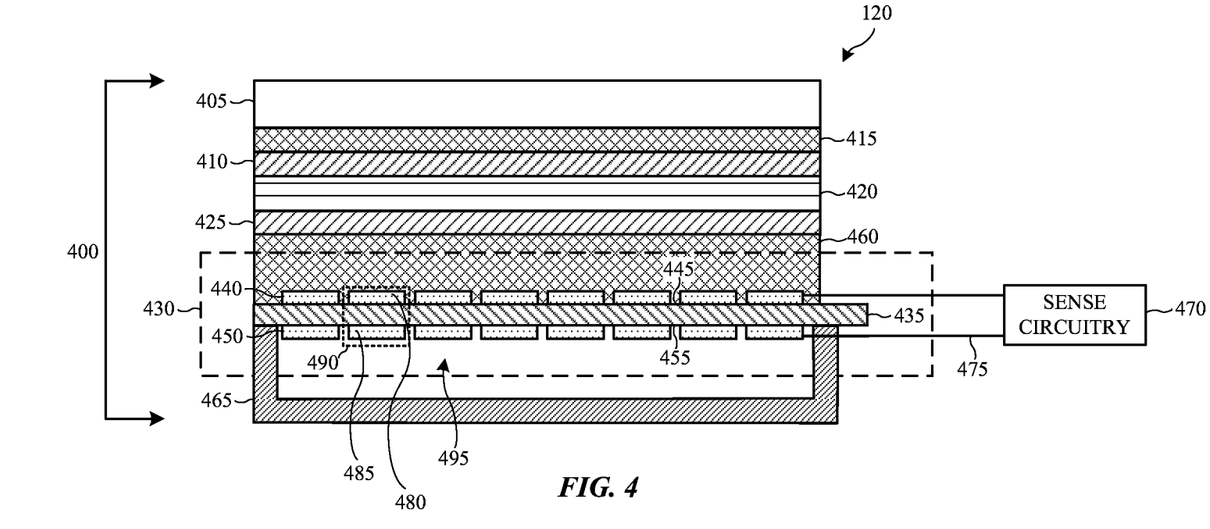
FIG. 4 illustrates a cross-section of a display of an example electronic device according to one or more embodiments of the present disclosure.

FIG. 4 depicts a cross-section view of the display 120 (FIG. 1). The cross-section view illustrates a display stack 400 for the display 120. A cover glass 405 is positioned over a front polarizer 410. The cover glass 405 can be a flexible touchable surface that is made of any suitable material, such as, for example, a glass, a plastic, sapphire, or combinations thereof. The cover glass 405 can act as an input region for a touch sensing device and a force sensing device by receiving touch and force inputs from a user. The user can touch the cover glass 405 with one or more fingers or with another element such as a stylus.

An adhesive layer 415 can be disposed between the cover glass 405 and the front polarizer 410. Any suitable adhesive can be used in adhesive layer 415. In one example, the adhesive layer 415 is an optically clear adhesive. A display layer 420 can be positioned below the front polarizer 410. As described previously, the display layer 420 may take a variety of forms, including a liquid crystal display (LCD), a light-emitting diode (LED) display, and an organic light-emitting diode (OLED) display. In some embodiments, the display layer 420 can be formed from glass or have a glass substrate. Embodiments described herein include a multi-touch touchscreen LCD display layer.

Additionally, the display layer 420 can include one or more layers. For example, a display layer 420 can include a VCOM buffer layer, a LCD display layer, and a conductive layer disposed over and/or under the display layer. In one embodiment, the conductive layer may comprise an indium tin oxide (ITO) layer.

A rear polarizer 425 may be positioned below the display layer 420, and a strain-sensitive structure 430 below the rear polarizer 425. The strain-sensitive structure 430 includes a substrate 435 having a first set of independent strain-sensitive films 440 on a first surface 445 of the substrate 435 and a second set of independent strain-sensitive films 450 on a second surface 455 of the substrate 435. In the illustrated embodiment, the first and second surfaces 445, 455 are opposing top and bottom surfaces of the substrate 435, respectively. An adhesive layer 460 may attach the substrate 435 to the rear polarizer 425.

The strain-sensitive films may be formed as an array of rectilinear strain sensing elements. Each strain-sensitive film in the first set of independent strain-sensitive films 440 is aligned vertically with a respective one of the strain-sensitive films in the second set of independent strain-sensitive films 450. In many embodiments, each individual strain-sensitive film may take a selected shape. For example, in certain embodiments, the strain-sensitive film may be deposited in a serpentine pattern although other patterns may be used.

A back light 465 can be disposed below the strain-sensitive structure 430. The back light 465 may be configured to support one or more portions of the substrate 435 that do not include strain-sensitive films. For example, the back light 465 can support the ends of the substrate 435. Other embodiments may configure a back light 465 differently.

The strain-sensitive films are typically connected to sense circuitry 470 through conductive connectors 475. The sense circuitry 470 is configured to detect changes in an electrical property of each of the strain-sensitive films. In this example, the sense circuitry 470 may be configured to detect changes in the resistance of the strain-sensitive films 440, 450, which can be used to estimate a force that is applied to the cover glass 405. In some embodiments, the sense circuitry 470 may also be configured to provide information about the location of a touch based on the relative difference in the change of resistance of the strain-sensitive films 440, 450.

For example, the strain-sensitive films 440, 450 can be configured as strain gauges that are formed with a piezoresistive material. When a force is applied to an input region (e.g., the cover glass 405), the strain-sensitive structure 430 is strained and the resistance of the piezoresistive material changes in proportion to the strain. The force can cause the strain-sensitive structure 430 to bend slightly. As a result, the bottom of the strain-sensitive structure elongates while the top compresses. The strain gauges measure the elongation or compression of the surface, and these measurements can be correlated to the amount of force applied to the input region.

Two vertically aligned strain-sensitive films (e.g., 480 and 485) form a strain sensing element 490. The sense circuitry 470 may be adapted to determine a difference in an electrical property of each strain sensing element. For example, a force may be received at the cover glass 405, which in turn causes the strain-sensitive structure 430 to bend. The sense circuitry 470 is configured to detect changes in an electrical property (e.g., resistance) of the one or more strain sensing elements, and these changes are correlated to the amount of force applied to the cover glass 405.

In the illustrated embodiment, a gap 495 exists between the strain-sensitive structure 430 and the back light 465. Strain measurements intrinsically measure the force at a point on the top surface of the substrate 435 plus the force from the bottom at that point on the bottom surface of the substrate 435. When the gap 495 is present, there is no force on the bottom surface. Thus, the force on the top surface can be measured independently of the force on the bottom surface. In alternative embodiments, the strain-sensitive structure 430 may be positioned above the display layer when the display stack 400 does not include the gap 495.

Figure 5:
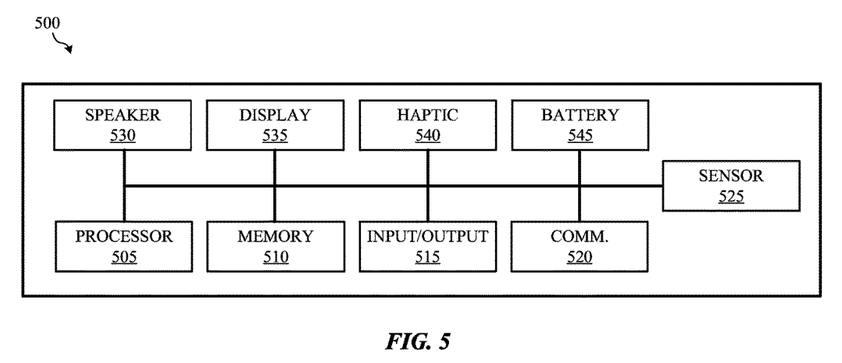
FIG. 5 illustrates example components of an electronic device according to one or more embodiments of the present disclosure.

FIG. 5 depicts various components and modules that may be present in an example electronic device 500. More specifically, the components and modules shown and described with respect to FIG. 5 may be used or incorporated with the electronic device 100 of FIG. 1.

As shown in FIG. 5, the electronic device 500 includes at least one processor 505 or processing unit configured to access a memory 510. The memory 510 may have various instructions, computer programs, force thresholds or other data stored thereon. The instructions or computer programs may be configured to perform one or more of the operations or functions described with respect to the electronic device 500. For example, the instructions may be configured to control or coordinate the operation of the display 535, one or more input/output components 515, one or more communication channels 520, one or more sensors 525, a speaker 530, and/or one or more haptic actuators 540.

The processor 505 may be implemented as any electronic device capable of processing, receiving, or transmitting data or instructions. For example, the processor 505 can be a microprocessor, a central processing unit (CPU), an application-specific integrated circuit (ASIC), a digital signal processor (DSP), or combinations of such devices.

The memory 510 can store electronic data that can be used by the electronic device 500. For example, the memory 510 can store electrical data or content such as, for example, audio and video files, documents and applications, device settings and user preferences, timing and control signals or data for the various modules, data structures or databases, and so on. The memory 510 may also store instructions for determining one or more operating conditions of the electronic device 500, which applications are executing, as well as the various force thresholds associated with each low-pass filter. The memory 510 may be any type of memory such as, for example, random access memory, read-only memory, Flash memory, removable memory, or other types of storage elements, or combinations of such devices.

As briefly discussed above, the electronic device 500 may include various input and output components represented in FIG. 5 as Input/Output 515. Although the input and output components are represented as a single item, the electronic device 500 may include a number of different input components, including buttons, input surfaces, microphones, switches, and dials for accepting user input. In some embodiments, the input and output components may include one or more touch sensor and/or force sensors. For example, the display 535 may be comprised of a display stack that includes one or more touch sensors and/or one or more force sensors that enable a user to provide input to the electronic device 500.

The electronic device 500 may also include one or more communication channels 520. These communication channels 520 may include one or more wireless interfaces that provide communications between the processor 505 and an external device or other electronic device. In general, the one or more communication channels 520 may be configured to transmit and receive data and/or signals that may be interpreted by instructions executed on the processor 505. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces, Wi-Fi interfaces, TCP/IP interfaces, network communications interfaces, or any conventional communication interfaces.

The electronic device 500 may also include one or more sensors 525. Although a single representation of a sensor 525 is shown in FIG. 5, the electronic device 500 may have many sensors. These sensors may include biometric sensors, temperature sensors, accelerometers, barometric sensors, moisture sensors and so on. The sensors may be used to determine one or more operating conditions of the electronic device 500.

One or more one or more acoustic modules or speakers 530 may also be included in the electronic device 500. The speaker 530 may be configured to produce an audible sound or an acoustic signal. The speaker 530 may be used to provide an audible sound that is associated with a particular type of haptic output to inform the user when one or more force thresholds have been crossed.

As also shown in FIG. 5, the electronic device 500 may include one or more haptic actuators 540. The haptic actuators 540 may be any type of haptic actuator including rotational haptic devices, linear haptic actuators, piezoelectric devices, vibration elements, and so on. The haptic actuator 540 is configured to provide punctuated and distinct feedback to a user of the electronic device 500. In some embodiments, the haptic actuator may provide haptic feedback when one or more force thresholds are crossed.

In certain embodiments, the electronic device 500 may include an internal battery 545. The internal battery 545 may be used to store and provide power to the various components and modules of the electronic device 500 including the haptic actuator 540. The battery 545 may be configured to be charged using a wireless charging system although a wired charging system may also be used.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for determining a type of input received on a surface of an electronic device, the method comprising:
    receiving a continuous force signal from a force sensing device;
    providing the continuous force signal to a first low-pass filter having a first bandwidth;
    concurrently providing the continuous force signal to a second low-pass filter having a second bandwidth that is greater than the first bandwidth;
    determining, within a first time period, whether the continuous force signal exceeds a first threshold associated with the first low-pass filter; and
    determining, within a second time period, whether the continuous force signal exceeds a second threshold associated with the second low-pass filter, wherein the second time period is shorter than the first time period and the second threshold is higher than the first threshold.

2. The method of claim 1, further comprising triggering a button press event when the continuous force signal exceeds the first threshold within the first time period.

3. The method of claim 2, further comprising triggering a button release event when the continuous force signal falls below a third threshold that is associated with the first low-pass filter, the third threshold being less than the first threshold.

4. The method of claim 1, further comprising triggering a button press event when the continuous force signal exceeds the second threshold within the second time period.

5. The method of claim 4, further comprising triggering a button release event when the continuous force signal falls below a fourth threshold that is associated with the second low-pass filter, the fourth threshold being less than the second threshold.

6. The method of claim 1, wherein the first low-pass filter attenuates a first amount of noise and wherein the second low-pass filter attenuates a second amount of noise.

7. The method of claim 6, wherein the second amount of noise is less than the first amount of noise.

8. The method of claim 1, further comprising issuing an interrupt to an operating system of the electronic device when the continuous force signal exceeds the first threshold.

9. The method of claim 1, further comprising issuing an interrupt to an operating system of the electronic device when the continuous force signal exceeds the second threshold.

10. An electronic device comprising:
    a force sensing device;
    a processing unit; and
    a memory coupled to the processing unit, the memory for storing instructions which, when executed by the processing unit, causes the processing unit to determine a type of input received on a surface of the electronic device, the method comprising:
        receiving samples of a continuous force signal from the force sensing device;
        performing a first low-pass filtering of the samples of the continuous force signal with a first low-pass filter having a first bandwidth by averaging a first number of previous samples of the continuous force signal;
        concurrently with performing the first low-pass filtering, performing a second low-pass filtering of the samples of the continuous force signal using a second low-pass filter having a second bandwidth, the second bandwidth greater than the first bandwidth, by averaging a second number of previous samples of the continuous force signal that is different than the first number;
        receiving a first output from the first low-pass filtering at a first output rate;
        receiving a second output from the second low-pass filtering at a second output rate; wherein the second output rate is higher than the first output rate;
        determining, within a first time period, whether the continuous force signal exceeds a first threshold associated with the first low-pass filter;
        determining, within a second time period, whether the continuous force signal exceeds a second threshold associated with the second low-pass filter, wherein the second time period is shorter than the first time period and the second threshold is higher than the first threshold; and
        determining the type of input associated with the continuous force signal based on the first output and the second output.

11. The electronic device of claim 10, wherein the force sensing device comprises a strain sensor.

12. The electronic device of claim 10, wherein the force sensing device comprises a capacitive sensor.

13. The electronic device of claim 10, wherein the force sensing device is associated with a display stack of the electronic device.

14. The electronic device of claim 10, wherein force sensing device is associated with a mechanical input device.

15. The electronic device of claim 10, wherein the discrete event is a button press event.

16. The electronic device of claim 10, further comprising instructions for determining when the continuous force signal falls below a third threshold associated with the output from the first low-pass filtering or a fourth threshold associated with the output from the second low-pass filtering, wherein the third threshold is less than first threshold and the fourth threshold is less than second threshold.

17. A method for translating a continuous force signal into a discrete event, the method comprising:
    receiving the continuous force signal from a force sensing device;
    concurrently providing the continuous force signal to a first low-pass filter and a second low-pass filter;
    sampling output from the first low-pass filter at a first rate;
    sampling output from the second low-pass filter at a second rate; and
    issuing a command associated with the output from the first low-pass filter when the output from the first low-pass filter exceeds a first threshold; and
    issuing a command associated with the output from the second low-pass filter when the output from the second low-pass filter exceeds a second threshold that is greater than the first threshold.

18. The method of claim 17, wherein the first low-pass filter has a first bandwidth and the second low-pass filter has a second bandwidth that is greater than the first bandwidth.

19. The method of claim 17, wherein the output of the first low-pass filter comprises an average of the last N number of samples of the continuous force signal.

20. The method of claim 19, wherein the output of the second low-pass filter comprises an average of the last M number of samples of the continuous force signal, wherein M is less than N.

* * * * *